Feb. 5, 1935.    W. T. RAY    1,990,094
SYSTEM OF CONDITIONING AIR AND OTHER GASES AND APPARATUS THEREFOR
Filed Jan. 31, 1931
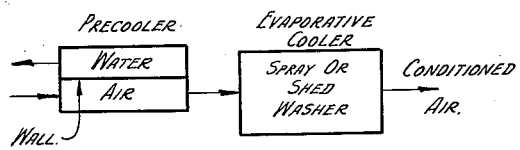
FIG. 1    TABLE A.
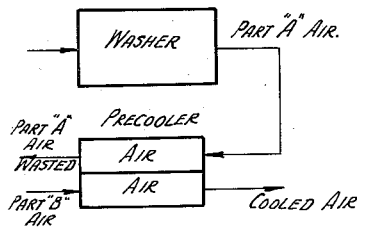
FIG. 2    TABLE B 1ST STAGE.
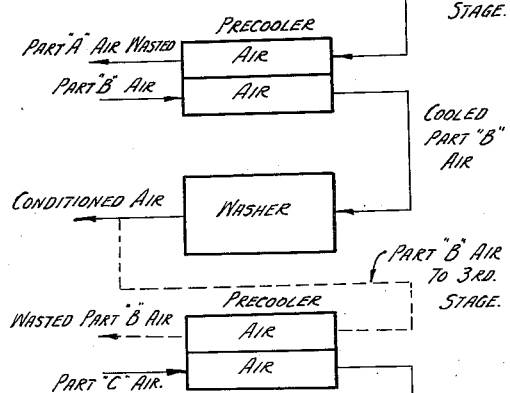
FIG. 3    TABLE C.
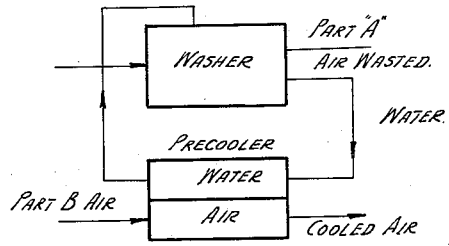
FIG. 2'    TABLE B 1ST STAGE.
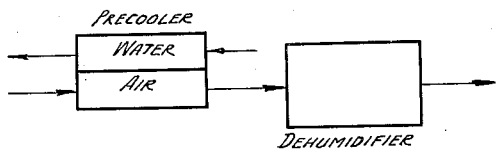
FIG. 4
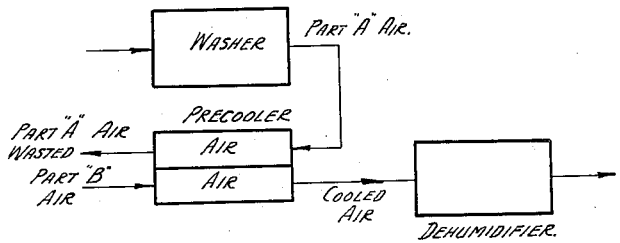
FIG. 5    TABLE B 1ST STAGE.
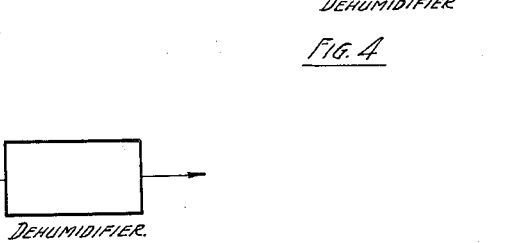
INVENTOR.
Walter T. Ray
BY William W. Varney
ATTORNEY.

Patented Feb. 5, 1935

1,990,094

UNITED STATES PATENT OFFICE 1,990,094

SYSTEM OF CONDITIONING AIR AND OTHER GASES AND APPARATUS THEREFOR

Walter T. Ray, Brewster, N. Y., assignor, by mesne assignments, to William W. Varney, Baltimore, Md.

Application January 31, 1931, Serial No. 512,609

5 Claims. (Cl. 62—176)

One of the common methods of cooling air in hot and dry climates has been to pass it through an air washer of high efficiency, thus cooling it by evaporation, adiabatically. In most treatises on the subject it is stated that air can be thus cooled only to its wet bulb temperature as a theoretical lower limit, in case cooling water is not available; and, in case water is available, that air can be cooled only to the temperature of this cooling water as a lower theoretical limit. The purpose of this invention is to cool air in most cases to an actual temperature lower than either or both of the above assumed minimum temperatures, without the use of mechanical refrigeration.

In practice it has been found that evaporative cooling has been limited to use in hot and dry climates, as in most climates, such as those of New York city and Chicago, for example, the relative humidity was thereby raised to such a percentage as to make the air feel very moist. It is well known that comfort or "effective temperature" depends on the total heat (above 0° F.) in each pound of (dry) air, with its moisture burden, as well as on the dry-bulb temperature. This total heat is of course well known to be dependent on the wet-bulb temperature; but the wet bulb temperature is a function of two other functions—the dry-bulb temperature and the dew-point temperature, which latter, in turn, is a function of nothing excepting the weight of water vapor carried as a burden by each pound of dry air.

The problem, then, is to devise a means of reducing the moisture burden below what it would be if the air were cooled by adiabatic evaporative cooling in a spray or shed or other type of washer of 100% efficiency, or even below what it would be if cooled by a very large amount of cooling water in a washer, all without the application of mechanical refrigeration. I shall describe herein how I improve both of these performances, and without the use of an excessive amount of cooling water, and without mechanical refrigeration. The practical value of this accomplishment lies in its making possible the evaporative cooling of theatres, etc. in climates such as those of Chicago and New York; in fact, in all of the United States and Canada, excepting in the high-temperature high-humidity regions, as along the seacoasts; also in most other portions of the world, outside of the tropics. I shall show that the reduction of the "effective" or comfort temperature below that of raw (fresh) outdoor air is greater by about a half, ordinarily, than in case of the two usual methods, mentioned above; and this larger reduction is quite enough to make a store, for instance, reasonably comfortable.

In order to enable ready comparison I have listed the steps and final conditions of old and new methods in tabular form.

I take a specific weather condition. The hottest and most disagreeable weather we are apt to have in New York or Chicago is about 100 degrees dry-bulb and 75 degrees wet-bulb. I am aware that both temperatures are frequently exceeded; but after a thorough study of hourly temperatures and humidities in many past years, hour by hour, I find they are seldom or never exceeded simultaneously, and there are not perhaps 10 days in 10 years when they are reached simultaneously, and then for only an hour or two at a time, which period is easily bridged over by the "cold" stored in the walls, furniture, etc., of the cooled room. I also find that the water in the city mains of these cities seldom gets up to 70° F., and then for only a day or two, due to an excessive spell of hot weather; fortunately there is ordinarily a lag of a few days between air and city-water temperature, so that the hottest air seldom or never occurs with the hottest city water. I, therefore, am assuming a combination of an air condition of 100 degrees dry-bulb, 75 degrees wet-bulb, and 70 degrees cooling water temperature.

Table "A"

| | | Dry bulb | Wet bulb | Per cent relative humidity | Dew point | Total heat | Grains moisture | Effective temp. at 100' per min. vel. |
|---|---|---|---|---|---|---|---|---|
| 1 | Raw (fresh) outdoor air | 100 | 75 | 30 | 63 | 37.8 | 86.2 | 83.8 |
| 2 | Raw air washed in perfect washer with water recirculated | 75 | 75 | 100 | 75 | 37.8 | 131.4 | 73.3 |
| 3 | Raw air washed adiabatically in washer of 80% efficiency | 80 | 75 | 80 | 73 | 37.8 | 122.6 | 75.9 |
| 4 | Raw air washed in perfect washer supplied with infinite amount of cooling water at 70° F | 70 | 70 | 100 | 70 | 33.5 | 110.5 | 66.0 |
| 5 | Raw air washed with large amount of cooling water but with washer efficiency of 80% | 76 | 71 | 79 | 69 | 34.3 | 106.6 | 72.0 |
| 6 | Raw air precooled by passing through cooler having reasonable amount cooling water passing through it counter current to the air, efficiency 80% | 76 | 67.4 | 64 | 63 | 31.5 | 86.2 | 70.7 |
| 7 | Precooled air of line (6) passed through adiabatic washer of 80% efficiency, water recirculated | 69.2 | 67.4 | 91 | 66.6 | 31.5 | 98.0 | 66.3 |
| 8 | Air of line (7) after picking up 4 gr. moisture and 2.5 B. t. u. per lb | 77.4 | 70.7 | 72 | 67.7 | 34.0 | 102.0 | 72.7 |
| 9 | Indoor condition recommended by authorities for 100° D. B. outside | 82.0 | 66 | 42 | 56.5 | 30.4 | 68.0 | 73.5 |

Referring to the Table "A", the first line gives raw or fresh air conditions, as above, with other characteristics added; it is to be remembered that these added characteristics are fixed by the wet and dry bulb temperatures. In the case of mixtures of dry air and water vapor, when any two items of condition are assumed the other conditions are fixed; there can be no manipulation. The effective or comfort temperatures for 100 ft. per minute air velocity are taken from the generally accepted charts. Authorities differ a little, but relatively the showing would be about the same.

Line (1) of the table gives the properties of raw (fresh) air outdoors; and to the average person in it, at light work with the air moving past at 100 ft. per minute velocity, the air has an effective temperature of 83.8 deg. F., which is far above the comfort zone. If this air be put through a perfect washer in which the water is continuously recirculated in very large quantities, the air will be adiabatically cooled to its wet bulb temperature, and will emerge 100% humidified, wherefore its dry bulb and dew point temperatures will also be 75° F. Its effective temperature will be 73.3 deg., which is about 10 deg. less than for the fresh outdoor air, but still very hot and humid. Now, in practice no washer is complete in its performance, and an efficiency of 80% is good daily practice; that is, the air is not completely humidified, and is cooled only 80% of the distance from 100 deg. down to 75 deg. or to 80 deg. dry bulb; the wet bulb of course remains the same, at 75 deg. as the process is adiabatic. The effective temperature is 75.9 deg.,—a little more disagreeable than for complete humidification as in line (2). Here I point out again that line (2) represents the maximum theoretical cooling that can be done by evaporative cooling, and line (3) the usual good actual performance, both cases being according to the usual textbook teachings.

Coming now to cooling by passing the air through large amounts of cold water at 70 deg. F.,—line (4) shows the best that can be done by using an infinite amount of water; that is, the air will come out at 70 dry bulb, 70 wet bulb, 100% relative humidity, 70 deg. dew point, and 68.0 deg. effective temperature. This is a few degrees better than either of the previous performances, and the effective temperature is down to 68 deg. but after putting it into a conditioned room it would warm up and be disagreeably hot. Further, in practice, no washer is perfect, so I add line (5), for a cooling of 80% efficiency, as before; the effective temperature is 72.0 deg., which is 4 deg. higher than for the perfect performance of line (4), and even the effective temp. of line (4) was too high.

I now come to the first stage with my invention, which consists in first passing the raw (fresh) outdoor air through a cooler, which I term a precooler, in which the air is on the one side of a metal wall, and the cooling water on the other. Preferably the air and water move in opposite directions, that is, with counter-current flow, so as to economize water. The air is thus cooled anhydrously without raising its moisture content; here, again, I have assumed a cooler efficiency of 80%, although it is commercially feasible to exceed this performance. The air will come out as per line (6); the effective temp. is 70.7 deg., which is of course not bad in itself, but the air would become too warm on passing through a conditioned room. Therefore, as my invention, I combine with this precooler a succeeding adiabatic, humidifying washer, through which the air passes, coming out as per line (7). The final effective temperature is only 66.3 deg. Now compare this with the usual performance of line (3). The reduction of effective temperature from the 83.8 deg. of line (1) to the 75.9 deg. of line (3) is through 7.9 deg.; but the effective temperature reduction from line (1) to line (7) is from 83.8 to 66.3 deg., or through 17.5 deg., which is over twice as much reduction.

Comparing with line (5), in which an ordinary washer has an excessive amount of cold water running through it and to the sewer, line (5) shows the effective temperature reduction is from 83.8 deg., line (1), to the 72.0 deg. of line (5), or 11.8 deg. For line (7), as figured above, the reduction is from 83.8 deg. to 66.3 deg., or through a range of 17.5 deg., which is a half greater. Now for a cooling effect almost twice as great, we use less water. Experience shows that with a washer of the type of line (5) a very large quantity of water is required to cool one theater. With my precooler method, with a heat-transfer efficiency of 80%, about .3 lb. of water only is needed per lb. of air.

Consider now putting the air of line (7) into a room. If there be no recirculation, but all the air be fresh air to the amount of 30 to 35 cubic feet per minute per occupant, and there be no excessive sources of outside heat, or moisture, the heat picked up will be about 2.5 B. t. u. per pound of air, and the moisture about 4 grains. Therefore, I show in line (8) the composition of the air leaving the room with these increases in heat and moisture. As we know the final heat and moisture contents, all the other items are obtained from a psychrometric chart. For comparison I give in line (9) an average of the most desirable indoor conditions for an outdoor temperature of 100° F. dry bulb, as recommended by various authorities. This line gives the desirable condition. Comparing line (8) with line (9), the most desirable condition, the dry bulb is 4.6 degrees lower, the wet bulb 4.6 degrees higher, and effective temperature 0.8 degrees lower, and several degrees lower than it would be with either of the old evaporative methods.

I will now describe a further stage of my invention. The above consisting of precooling outdoor air by passing it through a cold-water cooler so as to lower its total heat content and wet-bulb temperature, before passing it through an evaporative adiabatic cooler; specific practical examples were worked out, showing that the effective temperature of a cooled room full of people could be lowered by about 90% more than with the usual evaporative cooling; or, it could be lowered the same amount according to the dry-bulb temperature, with a much lower wet-bulb temperature, which would be much more comfortable. This scheme contemplated the use and discard of considerable amounts of precooling water, and while not expensive, it sometimes cannot be had. The stage about to be described enables a benefit nearly as great to be attained, with the consumption of a fraction as much water, and a power increase of a few per cent, although less power will be used than with refrigeration.

Table "B"

|   |   | Dry bulb | Wet bulb | Percent relative humidity | Dew point | Total heat | Grains moisture | Effective temp. 100' vel. |
|---|---|---|---|---|---|---|---|---|
| 1 | Raw (outside) air | 100 | 75 | 30 | 63 | 37.8 | 86.2 | 83.8 |
| 2 | Part A, washed adiabatically | 77 | 75 | 91 | 74.3 | 37.8 | 128.4 | 74.4 |
| 3 | Part B, cooled by part A | 80 | 68.7 | 57 | 63 | 32.5 | 86.3 | 73.3 |
| 4 | Part B, washed adiabatically | 70 | 68.7 | 94 | 68 | 32.5 | 103 | 67.4 |

The most desirable effective temperature given by some authors for an outdoor temperature of 100 deg. is about 73 deg. so that line (4) falls well below it. It is true that the moisture burden is a little higher than these same authorities suggest, but not much; the most desirable conditions on an extremely hot day would involve refrigeration, at a great increase of cost, for a few days use a year. Moreover, in the last process the air need not be cooled so low nor humidified so much.

For certin uses, such as dough room conditioning, usually involving refrigeration, the method works out beautifully over a very wide territorial range of our continent.

In Table "B" the raw, outdoor air conditions are assumed the same as in the former Table "A", that is, 100 dry-bulb and 75 deg. wet bulb, given in the first line. This outdoor air is taken in by this apparatus in two parts, A and B. Part A is put through an adiabatic washer, assumed to be of high but not unattainable efficiency, so that the air and water in it are reduced to a dry-bulb temperature of 77 deg., the air leaving at 75 deg. wet-bulb, of course, as per the second line of the table. This washer may be simple or multi-stage. The air or water or both are now used for precooling the separate part B of raw air by means of a precooler of the same metal-wall type as mentioned in the previous table, which keeps part A and part B from actual physical contact with each other; there is merely a transfer of heat from part B to part A through the metal wall; the efficiency of this heat exchanger, when of counter current construction may feasibly be as high as 90%, and it will therefore cool air part B through 90% of the dry-bulb range from 100 deg. to 77 deg., or through 90% of 23 deg., or, to be safe, through 20 deg. to 80 deg. As the dew point of 63 deg. is not changed, all other conditions are fixed as per line (3), the wet-bulb temperature having been reduced from 75 to 68.7 deg., merely by the expenditure of a little fan power and the evaporation of a little water. Air part A is discharged to the atmosphere, as it has been warmed up nearly to 100 deg., unless there be on the premises some process which can make use of air at a high temperature and high humidity.

Instead of using air part A, after washing to cool air part B, we may use instead the circulating water of part A, which water is kept cool by adiabatic evaporation into the air part A. In general, pre-cooling heat interchangers are smaller and of higher efficiency if liquid is used on one side of the metal wall of the cooling surface instead of gas on both sides, especially if the gas side of the metal wall be provided with extended surface. Said water may then be recirculated with another body of air A.

Air part B is next put through an adiabatic spray or other type washer of 90% efficiency (say), which will reduce its dry-bulb temperature by 90% of 80 deg. minus 68.7 deg., as per line (4), or approximately to 70 deg. dry bulb, 68.7 deg. wet bulb, 94% relative humidity, 68.0 deg. dew point temperature and 67.4 deg. effective temperature.

Now by the usual method of evaporative cooling the best that could be done would be as per line (2), the effective temperature of which is 74.4 deg., which is a reduction of 9.4 deg. below that for raw air. But by this method we reduce the effective temperature from 83.8 deg. to 67.4 degrees, through a drop of 16.4 deg., which is about 75% greater.

I wish to point out now that the second stage is the first step of a series of steps which could be used to cool air, or any other gas, to its dew-point temperature (theoretically). For instance, take the same air as used in Table B, atmospheric dry-bulb 100 deg., wet-bulb 75 deg., dew point 63 deg., and we get Table C

|   |   | Dry bulb | Wet bulb | Per cent relative humidity | Dew point | Total heat | Grains moisture | Effective temp. 100' velocity |
|---|---|---|---|---|---|---|---|---|
| 1 | Raw (outside) air | 100 | 75 | 30 | 63 | 37.8 | 86.2 | 83.8 |
| 2 | Part A, washed adiabatically | 77 | 75 | 91 | 74.3 | 37.8 | 128.4 | 74.4 |
| 3 | Part B, cooled by part A | 80 | 68.7 | 57 | 63 | 32.5 | 86.2 | 73.3 |
| 4 | Part B, washed adiabatically | 70 | 68.7 | 94 | 68 | 32.5 | 103.0 | 67.4 |
| 5 | Part C, cooled by Part B | 73 | 65.5 | 70 | 63 | 30.0 | 86.2 | 68.2 |
| 6 | Part C, washed adiabatically | 66.5 | 65.5 | 95 | 65 | 30.0 | 92.6 | 63.9 |
| 7 | Part D cooled by Part C | 70.0 | 65.5 | 78 | 63 | 30.0 | 86.2 | 66.2 |
| 8 | Part D after having heat and moisture added to it by room occupants | 77.5 | 68.8 | 64 | 64.3 | 32.5 | 90.3 | 72.0 |

Down to and including line (4) the above Table C is the Table B given in the second mentioned stage. In the above processes of lines (2), (3), and (4), the precooler and washer efficiencies were assumed to be 90%. Let us now take a third portion of raw air, part C, and precool it with the air of line (4), the two masses of air being out of physical contact with each other. Then part C will be precooled by 90% of the difference between 100° and 70°, or through 27 deg., which is down to 73 deg.; as the moisture content is not changed the dew point will remain at 63 deg., and part C will leave its precooler as per line (5). Now let part C be put through an adiabatic washer with recirculated water, having an efficiency of 90%; it will be cooled down 90% of the difference between its dry and wet bulbs, or 90% of 73 minus 65.5, which is through 6.75 deg., or to about 66.5 deg. The wet bulb temperature remains the same, at 65.5 deg., whence we fix the other items as listed on line (6). It now becomes evident that by using an infinite number of steps of any efficiency, even much lower than 90%, we should finally get air as cool as the raw air dew point of 63 deg., saturated, as a lower theoretical limit.

I wish to point out a remarkably useful result of this method. Suppose we stop with the air of line (5), and use it for ventilation. We have then available an air condition of raw air moisture (and no more) together with a dry-bulb temperature under the raw air wet-bulb temperature, without the use of refrigeration, which we have been taught was impossible. Although the use of three precoolers may never be commercially practicable, I add the next step, given in line (7). Please notice again how much the dry bulb temperature of the air of line (7) is under the wet bulb temperature of raw air, with no increase of moisture content above that of raw air.

I can see an immense field for such evaporative precoolers in unit air conditioners for offices, residences, stores, etc., as a unit-type apparatus, as each conditioner will require only an outdoor air intake and discharge, an electric extension cord, and a water make-up connection; the cooling effect will be about twice as great as for plain adiabatic evaporative cooling, as will be seen by comparing the effective temperatures of lines (2) and (6). I have added line (8) to give the conditions of the air of line (7) when leaving a room to which about 30 to 40 cubic feet have been supplied per person. Notice that the departing conditions of this air are better than the entering conditions of the air of line (2).

In this specifications and claims, when I use the term, "adiabatic treating of air", I mean, substantially, a treatment of air whereby the total heat content of the air remains substantially a constant, allowing, of course, for heat radiation and convection to and from the apparatus and circumstances as herein described, wherein, without extra precautions, a considerable loss may be incurred one way or the other, depending upon relative conditions. And, when I use the term, "anhydrous treatment of air", I mean the treatment of air without affecting its moisture content, such as in a cooler having conducting (metallic) walls separating it from the cooling element, or by sprays as of mercury, or other non-aqueous fluids.

I do not intend to limit the application of this invention to gases carrying a burden of water vapor only, as it is evident that other vapors, such as alcohol, or other products from paint and varnish rooms, and other processes, may be recovered in the wash water by being condensed out, and may occur in one or more, or all, the steps without changing the thermodynamical principles involved.

In this specification and claims, when I use the term, "air", I mean air, or a gaseous element; and when I use the term, "water", I mean a volatile fluid not necessarily water.

In the drawing of the herein-described embodiment of my invention, I have shown schematic diagrams of my invention.

Figure 1 being the scheme involved in the production of Table "A".

Figs. 2 and 2¹ being the scheme involved in the production of Table "B".

Fig. 3 being the scheme involved in the production of Table "C", and particularly illustrates the scheme of multi-stage conditioning.

Believing that the process illustrated in the schematic drawing is best understood by lettering the drawing, I have refrained from putting numerals thereon to avoid confusion.

The adiabatic washer, which is the last element in the various arrangements described, may be replaced by a conditioner of the usual type in which the evaporative cooling is augmented or replaced by mechanical or other refrigeration, as shown in Figs. 4 and 5.

With the foregoing and other objects in view, my invention consists of the methods employed, combination and arrangement of systems, apparatus and means as herein specifically set forth, provided and illustrated in the accompanying drawing wherein is shown the preferred embodiment of my invention, but it is understood that changes, variations and modifications may be resorted to which come within the scope of the claims hereunto appended.

Having thus described my invention, what I claim and desire to secure by Letters Patent is:

1. A system of air conditioning consisting of cooling a body of initial air adiabatically, then by means of this cooled air treating another body of initial air anhydrously to cool the same, then treating said other body of air adiabatically.

2. A system of air conditioning consisting of cooling a body of initial air adiabatically, then by means of this cooled air treating another body of initial air anhydrously to cool the same, then treating said other body of air adiabatically as a first stage, then repeating with said other air as initial air in a plurality of stages.

3. A system of air conditioning consisting of, cooling an initial body of air adiabatically with a liquid, then by means of one of the cooled elements, the liquid or the air, treating another body of initial air anhydrously to cool the same, then by means of this cooled air treating another body of initial air anhydrously to cool the same, then treating said other body of air adiabatically as a first stage, then treating said finally treated air as initial air in a multiple stage process, and repeating as desired.

4. A system of air conditioning consisting of, cooling a body of initial air adiabatically with a liquid, then by means of one of the cooled elements, the liquid treating another body of initial air anhydrously to cool the same and recirculating said treating element with another body of initial air to cool the treating element then by means of this cooled air treating another body of initial air anhydrously to cool the same, then treating said other body of air adiabatically as a first stage, then treating said finally treated air as initial air in a multiple stage process, and repeating as desired.

5. An apparatus for conditioning air comprising, first, an adiabatic heat transfer element, an anhydrous heat transfer element and a second adiabatic heat transfer element, means for circulating through said anhydrous heat transfer element a product from the first adiabatic heat transfer element and means for transferring air from said anhydrous heat transfer element which has been conditioned therein to the second adiabatic heat transfer element for adiabatic treatment therein.

WALTER T. RAY.